May 15, 1928.  1,669,519

F. W. HILD

MEASURING DEVICE

Original Filed Jan. 25, 1923   2 Sheets-Sheet 1

WITNESSES:
A.G. Schiefelbein
F.H. Miller

INVENTOR
Frederic W. Hild.
BY
Wesley G. Carr
ATTORNEY

May 15, 1928.
F. W. HILD
MEASURING DEVICE
Original Filed Jan. 25, 1923      2 Sheets—Sheet 2
1,669,519
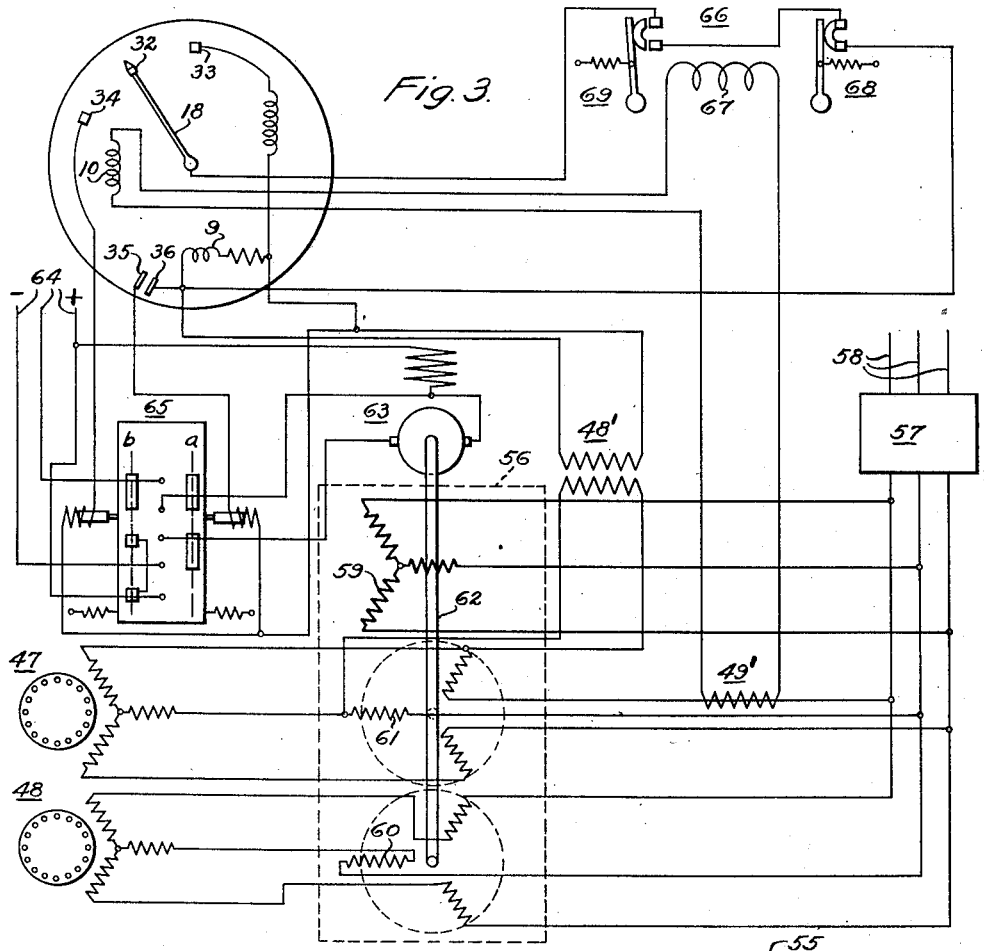
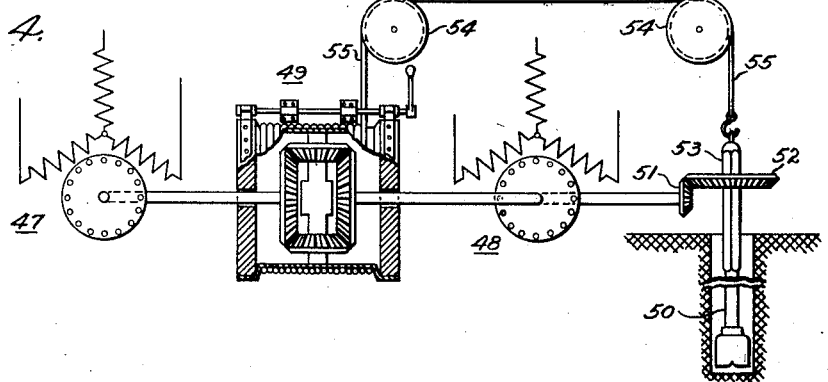
WITNESSES:
INVENTOR
Frederic W. Hild.
BY
ATTORNEY Patented May 15, 1928.

1,669,519

UNITED STATES PATENT OFFICE.

FREDERIC W. HILD, OF LOS ANGELES, CALIFORNIA.

MEASURING DEVICE.

Original application filed January 25, 1923, Serial No. 614,939. Divided and this application filed May 15, 1924. Serial No. 713,440.

My invention relates to measuring devices and particularly to measuring devices that are adapted for use in connection with control systems for oil-well, and other, earth drilling, and similar operations, such as shown and disclosed in my co-pending application, Serial No. 614.939, filed Jan. 25, 1923, of which the present application is a division.

One object of my invention is to provide a device of the above indicated character that shall indicate the pressures on the drill bit of a drilling mechanism for all drilling conditions and distances of drilling operation.

Another object of my invention is to provide a measuring device that shall comprise a combination of indicating, maximum-demand and pressure elements.

Another object of my invention is to provide a measuring device, employing an indicating member and an actuating element therefor, that shall relieve the actuating element of the resistance ordinarily imposed thereon by the indicating member.

A further object of my invention is to provide a measuring device that shall indicate the difference between the instantaneous and the maximum values of the quantity to be measured.

Figure 1:
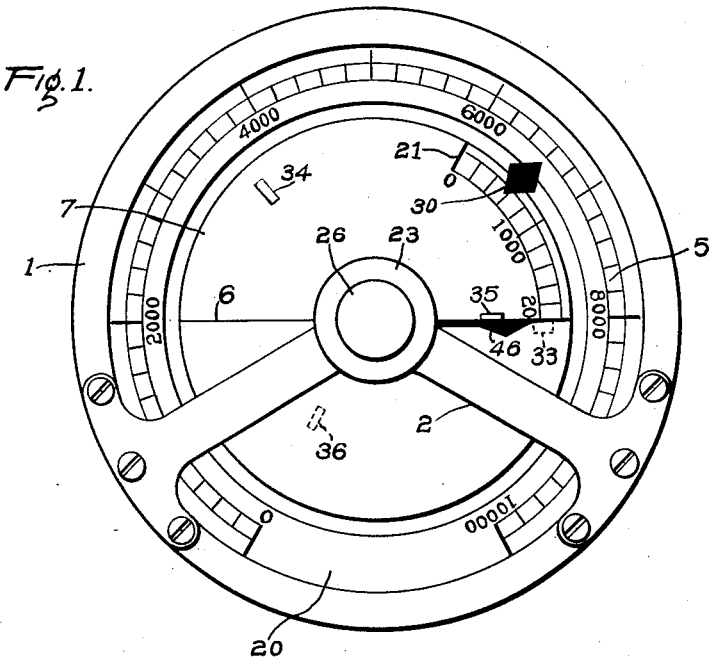
Figure 2:
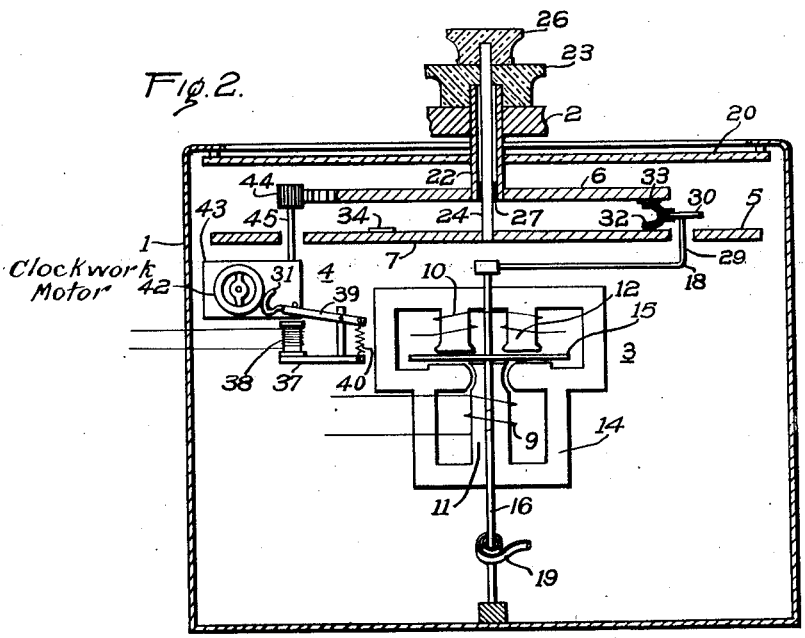

Figure 1 of the accompanying drawings, is a plan view of a measuring device constructed in accordance with my invention, Fig. 2 is a view, partially in elevation and partially in section, of the device shown in Fig. 1, Fig. 3 is a diagrammatic view of a control or regulating system that is adapted to be operated in accordance with the action of the apparatus illustrated in Fig. 1, and Fig. 4 is a semi-diagrammatic view of an earth-drilling apparatus with which the measuring device of my invention is adapted to co-operate.

Referring to Figs. 1 and 2, the device comprises, in general, a casing 1, a supporting bracket 2 thereon, a meter 3, an auxiliary motive device 4, a stationary dial 5, a maximum-demand indicating element or dial 6 and an element or dial 7.

The meter 3 is preferably of a usual type of wattmeter comprising a voltage coil 9 and a current coil 10, that are wound on polar projections 11 and 12, respectively, of a field magnet structure 14, in a usual and well known manner. A rotatable-disk armature 15 is mounted on a spindle or shaft 16 between the ends of the projections 11 and 12. The spindle 16 carries an indicating arm 18 that is biased to an initial or zero position by a spring 19. The stationary dial member 5 is preferably of annular shape and secured in position below a transparent cover member 20, that is secured to the casing 1. The maximum-demand element 6, which may be semi-circular in form, is rigidly secured to a sleeve 22 that extends upwardly through the cover member 20, and the bracket member 2 by which it is supported, and is provided with a knob or handle member 23, whereby the element 6 may be adjustably positioned.

The dial or element 7, which is preferably of circular shape, is disposed below the movable element 6, substantially in the plane of the stationary dial 5. A pin or shaft 24 is rigidly secured to the element 7 and extends upwardly, through the sleeve 22 to a knob or handle member 26 that is disposed above the handle member 23. A friction ring or sleeve 27 is provided between the sleeve 22 and the shaft 24 to permit the elements 6 and 7 to be adjustably moved relatively and to move together through the medium of the friction sleeve 27.

The outer end 29, of the indicating arm 18, projects upwardly through an annular space between the element 7 and the dial 5, and is provided with an index or target member 30, having points which co-operate, respectively, with the stationary dial 5 and with a scale 21 on the element 7.

The indicating arm 18 is also provided, adjacent to the index 30, with a flexible contact member 32 for co-operative engagement with a contact member 33, disposed on the lower side of the maximum-demand element 6, and a contact member 34 mounted upon the upper side of the element 7. The maximum-demand element 6 is further provided with a contact member 35 for engagement with a stationary contact member 36 in the zero position of the element 6.

The motive device 4 comprises a base member 37 for supporting a brake coil 38 and a movable brake arm 39 that is biased toward the braking position, by means of a suitable spring 40, as shown in Fig. 2. The brake arm 39 is provided, at one end, with a yieldable brake shoe 31 for engagement with an escapement wheel 42 of a clockwork mechanism 43. A pinion 44, that is adapted to be actuated by the clock mechanism 43, through a shaft 45, operatively engages the demand element 6 to turn the latter.

As shown in Fig. 3, the windings 9 and 10 of the meter 3 are adapted to be connected to an induction motor 47, the driving torque of which it is desired to control through voltage and current transformers 48' and 49', respectively.

In so far as this application is concerned, the index 30 is operated by the meter 3 to indicate on the stationary dial 5, the instantaneous values of the load on the motor 47 to which the meter 3 is connected, and the maximum element 7 is provided with a pointer element 46, also for co-operation with the stationary dial 5, for indicating the maximum values of the load on the motor 47, as in a usual maximum-demand meter.

However, the index 30 further co-operates with the pointer 46 to indicate, on the movable scale 21 on the element 7, the difference between the instantaneous and maximum values of the motor load, as indicated by the index 30 and the pointer 46, respectively.

Referring to Figs. 3 and 4, the motor 47 is connected to another induction motor 48, through a combined differential gear and winding-drum mechanism 49, the motor 48 being adapted to operate a rotary drill 50, through a bevel pinion 51, a rotary table or bevel gear wheel 52 and a square or fluted portion 53 of the drill 50 which is longitudinally slidable in the table 52.

The bit 50 is suspended from a crown or block pulley 54 by a rope or cable 55 which is wound on a drum mounted on the planetary element of the differential device 49.

The motors 47 and 48 are connected, through an induction regulator 56 and a suitable auto starter 57, or the like, to conductors 58 of a three-phase alternating-current supply line.

The regulator 56 comprises a stationary primary winding 59 of any suitable type and a plurality of rotatable secondary windings 60 and 61 that are, respectively, connected in circuit with the primary windings of the motors 48 and 47. The secondary members 60 and 61 may be driven through the agency of a common shaft 62 that is suitably associated with a pilot motor 63 which is mounted upon the top of the induction regulator 56. However, the respective windings of the two rotative elements 60 and 61 of the regulator are wound 180 electrical degrees out of phase with each other, as illustrated. One of these secondary members initially occupies its position of maximum "boost", while the other simultaneously occupies its position of maximum "buck". Consequently, a slight movement of the pilot motor 63 tends to increase the voltage applied to one of the induction motors 48 and 47 at the same time that the voltage upon the other is decreased.

A second source of energy, preferably a three-wire direct-current source 64, is provided for energizing the pilot motor 63 through the agency of a drum switch 65 and an overload-no-current relay 66 embodying an operating coil 67, an overload circuit-interrupter 68 and a no-current circuit interrupter 69.

As fully explained in my co-pending application, Serial No. 614,940, filed January 25, 1923, for a method of earth drilling, the motor 48 directly drives the rotary table 52 for the drill 50, while the motor 47 performs a regulating function with respect to variations of pressure at the drill point and is always energized proportionately to the effective weight of the drilling mechanism proper, i. e., the total weight of the suspended drilling device minus the contact pressure. As the drill pipe lengthens during the drilling operation, or as the weight increases by reason of the unwinding of the drill cable 55 from the drum, the maximum demand segment will be automatically advanced, by reason of the action of the clock-work mechanism 4, whenever the contact member 34 of the pointer arm 18 and the contact member 33 of the movable segment 6 come into engagement.

The movable elements 6 and 7 are initially set, by the handles 23 and 26, respectively, to the zero position on the dial 5 in which position the contact member 34 engages the contact member 35 and the contact member 32 engages the contact member 33. The index 30 and the pointer 46 are also in register at the zero position on the dial 5. When the circuits are energized, engagement of the contact members 34 and 32 closes a circuit to operate the drum switch 65 in one direction to condition the circuit system for an operation by engagement of the contact members 32 and 34, as hereinafter set forth.

Also, since the contact members 32 and 33 are in engagement, in the zero position of the elements, above described, energization of the circuits causes the coil 38 to attract the arm 39 against the action of the spring 40. This operation releases the brake shoe 31 from the escapement wheel 42 and permits the pinion 44 to turn the maximum-demand element 6 which will continue to be thus turned so long as the contact members 32 and 33 are engaged.

The contact members 32 and 33 will remain in engagement so long as the index 30 is actuated positively, or in the clockwise direction, as viewed in Fig. 1, by the meter 3. Thus, the meter 3 is relieved of the duty of moving the element 6. When the maximum value of the quantity being measured has been reached or the index 30 is reversed in its direction of movement, the contact members 32 and 33 are separated. This operation de-energizes the coil 38 and permits the spring 40 to return the shoe 31 to engagement with the escapement wheel 42, to thereby stop movement of the maximum element 6.

During the above described operation, the contact member 34 moves with the element 7, which is driven by the element 6 through the friction sleeve 27, to a new actual position, but in the same position relative to the contact member 33, the distance between the contact members 33 and 34 representing the torque range over which it is desired to operate the motor 47 to which the meter 3 is connected.

Since the motors 47 and 48 are energized, respectively in accordance with the effective weight of the drilling device and the rotative pressure on the bit 50, and are connected through the differential gear device 49, when the pressure on the bit 50 increases, the gear of the differential device next to the motor 48 tends to decrease in rotative speed with the motor 48, consequently, the planetary element and the drum attached thereto are actuated to exert a lifting effect on the bit 50. This action increases the effective weight of the drilling device on the motor 47 because the contact pressure of the bit with the earth is decreased. Consequently, more energy is demanded by the motor 47.

Such demand periods may occur at intervals, depending upon the natures of the different strata of earth encountered by the bit 50, and consequently a new position of the maximum segment 6 will be effected each time that the demand of one of these periods exceeds the preceding next greatest demand.

From the above, it is seen that the pointer 18 moves in the clockwise direction in accordance with increased effective weight of the drilling device on the motor 61 and in the counter-clockwise direction in accordance with increased drilling pressure on the motor 60. Thus, when this drilling pressure equals or exceeds a predetermined limit, determined by the adjusted distance between the contact members 34 and 33, the indicating arm 18 operates to move the flexible contact member 32 into engagement with the contact member 34. A circuit is thereby completed through the aforementioned drum switch 65 to control the motor 70 pressure or torque on the drilling bit, as above set forth and as more fully explained in the co-pending application.

By manipulation of the handles 23 and 26, the contact members 34 and 33 may be adjusted relatively to vary the torque range and to thereby compensate for variable conditions under which the motor is being operated.

By my invention, the meter 3 is relieved of the resistance ordinarily offered thereto by the maximum indicating member or pointer, and is thereby rendered more sensitive and accurate. A compact, self-contained structure is provided which gives a wide variety of data, such as the instantaneous value of the quantity being measured, the maximum value thereof and the difference between the instantaneous and maximum values.

While I have shown and described a particular form of my invention, changes may be effected therein without departing from the spirit and scope thereof, as set forth in the appended claims.

I claim as my invention:

1. In a demand meter, the combination with a scale member, a meter element, an indicating member actuated by said element and a member co-operating with said scale member for indicating maximum indications of said first indicating member, of a clock-work mechanism controlled by the first indicating member to actuate the maximum indicating member.

2. An electrical measuring device comprising a scale member, and a co-operating automatically relatively movable indicating element therefor including a scale and a pointer that are adjustable relative to each other and movable in concert relative to said first scale member.

3. An electrical measuring device comprising a scale member, a co-operating automatically relatively movable indicating element therefor including a scale and a pointer that are adjustable relative to each other and movable in concert relative to said first scale member, and an index member automatically relatively movable with respect to both said scales and co-operating therewith.

4. An electrical measuring device comprising a stationary scale member of substantially ring shape, a co-operating automatically relatively movable indicating element therefor including an annular scale portion concentric with said first scale member and a pointer adjustable relative to said second scale and movable in concert therewith, and an index member disposed between said scales in automatically relatively movable co-operation therewith.

5. An electrical measuring device comprising a stationary scale member of substantially ring shape, a co-operating automatically relatively movable indicating element therefor including a discoidal scale portion disposed in concentric flush relation to said first scale member and a pointer above said scales adjustable relative to said second scale and movable in concert therewith, and an automatically movable indicating element including a portion below, a portion projecting upwardly between and an index above said scales co-operating therewith.

6. A measuring device comprising an automatically movable indicating member, a second member adapted to move with said indicating member under predetermined conditions, a third member, and means for driving said third member by said second member and manually adjusting the relative positions of the second and third members.

7. A measuring device comprising an automatically movable indicating member, a second member adapted to be driven with said indicating member, a third member, and means for frictionally driving said third member by said second member and permitting relative movement therebetween.

8. A measuring device comprising an automatically movable indicating member, a second member adapted to be driven with said indicating member, a third member movable relative to the second member, and means for maintaining the third member in a predetermined position relative to said second member.

9. A measuring device comprising an indicating member, a second member adapted to be driven with said indicating member upon making an electrical contact therewith, a third member, and means whereby said third member may be frictionally driven by said second member and also adapted to make electrical contact with said indicating member.

10. A measuring device comprising an indicating member, a second movable member adapted to make electrical contact with said indicating member, means for driving said movable member along with said indicating member during such contact period, and a third movable member normally adapted to be driven by said second movable member.

11. A measuring device comprising an indicating member, a wattmeter element for actuating said member, a maximum demand member adapted to make intermittent electrical contact with said indicating member, a clockwork mechanism for driving said maximum demand member along with said indicating member during such contact period, and a member frictionally driven by said maximum-demand member and also adapted to make intermittent electrical contact with said indicating member.

12. A measuring device comprising an indicating member, a second member adapted to be driven with said indicating member upon making an electrical contact therewith, a third member frictionally driven by said second member and also adapted to make electrical contact with said indicating member, and means for manually adjusting the relative positions of said second and third members to determine the distance between the positions of contact.

13. A measuring device comprising an indicating member, a wattmeter element for actuating said member, a maximum demand member adapted to make intermittent electrical contact with said indicating member, a clockwork mechanism for driving said maximum demand member along with said indicating member during such contact period, a member frictionally driven by said maximum demand member and also adapted to make intermittent electrical contact with said indicating member, and means for manually adjusting the relative positions of said maximum demand and frictionally-driven members to determine the distance between the limiting positions of contact by said indicating member.

14. A measuring device comprising an indicating member, a wattmeter element for actuating said member, a maximum demand member adapted to make intermittent electrical contact with said indicating member, a clockwork mechanism for driving said maximum demand member along with said indicating member during such contact period, a member frictionally driven by said maximum demand member and also adapted to make intermittent electrical contact with said indicating member, means for manually adjusting the relative positions of said maximum demand and frictionally-driven members to determine the distance between the limiting positions of contact by said indicating member, and means for making another electrical contact when said maximum demand member occupies its zero position.

15. In a self-contained meter-unit structure, the combination with a scale member, a meter element and an indicating element co-operating with said scale member and movable in accordance with movement of the meter element, of means for causing said movement of the indicating element independently of the meter element comprising actuating means for the indicating element, co-operating contacts operatively associated with the meter and indicating elements, and means responsive to the closing or opening of said contacts for rendering said actuating means operative or inoperative.

16. In a demand meter, the combination with a scale member, a meter element, an indicating member actuated by said element and a member co-operating with said scale member for indicating maximum indications of said first indicating member, of means electrically controlled by the first indicating member to actuate the maximum-indicating member.

In testimony whereof, I have hereunto subscribed my name this thirtieth day of April, 1924.

FREDERIC W. HILD.